Feb. 20, 1962    T. J. DAVIDSON    3,021,857
CONTROL VALVE

Filed March 6, 1959    2 Sheets-Sheet 1

Feb. 20, 1962 T. J. DAVIDSON 3,021,857
CONTROL VALVE
Filed March 6, 1959 2 Sheets-Sheet 2

3,021,857
CONTROL VALVE
Thomas J. Davidson, Santa Ana, Calif., assignor to Robertshaw-Fulton Controls Company, Richmond, Va., a corporation of Delaware
Filed Mar. 6, 1959, Ser. No. 797,797
8 Claims. (Cl. 137—66)

This invention relates to valves for controlling the flow of fluid fuel to burners and the like and, more particularly, to solenoid-operated control valves.

One of the safety requirements for thermostatically controlled fluid fuel burners is that the main fuel line must be closed should the pilot flame be extinguished. In practice, this is often accomplished by a thermoelectric safety means having a solenoid or electromagnet current produced by a thermocouple positioned proximate to the pilot flame. The solenoid normally maintains an armature in an attracted position against the bias of a spring. Upon failure of the pilot flame, the electric current is cut off and the spring forces the armature to a released position. As the armature is operatively connected to the main fuel valve, it causes closure of the same upon movement to the released position.

It has long been desirable to use a solenoid means to operate the main valve to its open position as this operating solenoid would permit electrical control of the main valve from several points and a minimum number of parts would be required for the operating mechanism. However, this has been found to be impractical because the safety shut-off means tends to displace the armature of the operating solenoid when the latter has been actuated to its attracted position by energization of the operating solenoid. This armature displacement when the operating solenoid is energized results in higher power requirements, heating of the coils, and possible burning out of the solenoid or switch contacts. Also, if alternating current is used, destructive, audible vibration of the armature occurs. In order to avoid these undesirable results, lever systems permitting an override movement have been proposed. However, these lever systems have not been entirely satisfactory because they have been unduly complicated and result in an expensive construction.

It is an object of this invention to render the operating solenoid of a device of the indicated type inoperative to prevent valve closure by the thermoelectric safety means upon movement of the latter towards its valve closing position.

Another object of this invention is to permit closure of the main valve by the thermoelectric safety means while the armature of the operating solenoid is maintained in its attracted position.

Another object of this invention is to de-energize the operating solenoid upon movement of the thermoelectric safety valve means to its valve closing position.

Another object of this invention is to construct a control valve of the type indicated with a minimum number of parts which will render it economical to manufacture.

In one preferred embodiment of the invention, the operating solenoid means is operatively connected to the valve member and is constructed to be movable between an "active" position in which it maintains the valve member in an open position and an "inactive" position in which it permits closure of the valve member by the thermoelectric safety means which is also operatively connected to the valve member. In order to eliminate any interference by the operating solenoid means upon movement of the thermoelectric safety means to close the main valve, means are provided for causing movement of the operating solenoid means from its "active" to its "inactive" position in response to this movement of the thermoelectric safety means to close the main valve.

The above and other objects and features of this invention will appear more fully from a consideration of the following description taken in connection with the accompanying drawings wherein.

Figure 1:
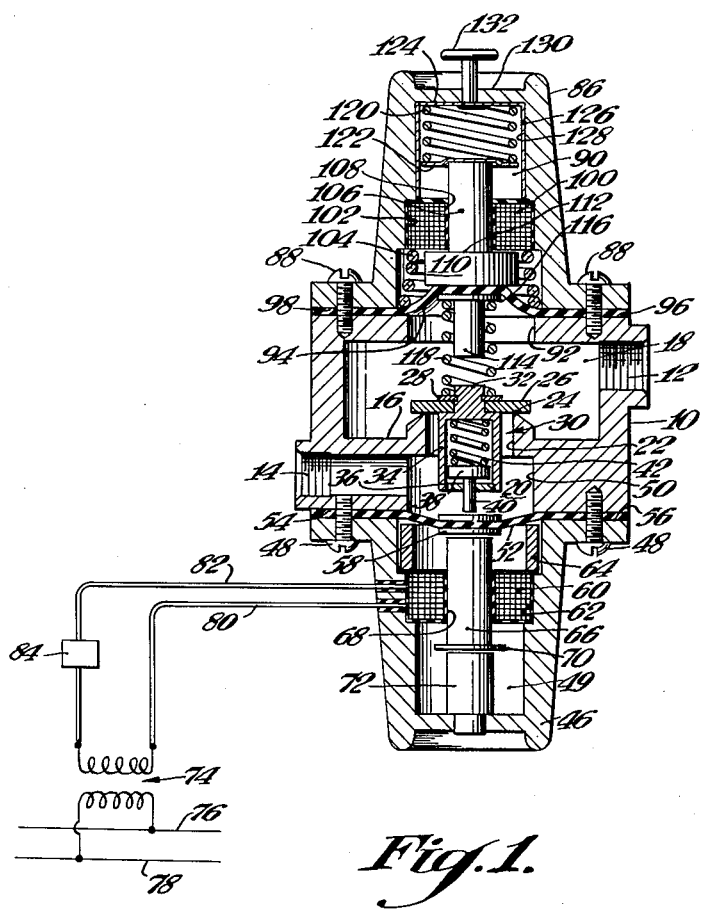
FIG. 1 is a sectional view of a preferred embodiment of the invention.

Referring now to the drawings, the control valve illustrated in FIG. 1 comprises a casing 10 having an inlet 12, an outlet 14 and a partition 16 therebetween. Partition 16 cooperates with casing 10 to define an inlet chamber 18 communicating with inlet 12 and an outlet chamber 20 communicating with outlet 14 and has a port 22 therein providing a passageway between inlet chamber 18 and outlet chamber 20. A valve seat 24 is formed on partition 16 around port 22 facing inlet chamber 18. Inlet 12 may be connected to a source of fluid fuel and outlet 14 may be connected to a burner apparatus.

A valve member 26 is adapted for movement relative to valve seat 24 for controlling the flow of fuel between inlet 12 and outlet 14. Valve member 26 is formed of an annular disc secured, by means of retaining clip 28, to a valve stem 30 which extends longitudinally within port 22. Valve member 26 is secured to valve stem 30 at a solid portion 32 thereof. Valve stem 30 has a hollow portion 34 closed off at its downstream end by an annular disc 36 threaded into the internal wall thereof. A plunger 38 is positioned within the interior of hollow portion 34 and has a shaft portion 40 extending through the central opening of annular disc 36 in axial alignment with valve stem 30. A spring 42 is mounted in compression between plunger 38 and solid portion 32 of valve stem 30 to bias plunger 38 to an extended position.

A lower housing 46 is secured to casing 10 by means of a plurality of bolts 48. Housing 46 has a substantially cylindrical internal cavity 49 in axial alignment with a bore 50 formed in casing 10 to communicate with outlet chamber 20. A flexible diaphragm 52 secured between cooperating faces 54 and 56 of casing 10 and housing 46, respectively, seals outlet chamber 20. A circular disc 58 is secured to diaphragm 52 on opposite sides thereof in alignment with shaft portion 40 of plunger 38.

Solenoid means are provided for actuating valve member 26 to an open position. Such means comprises a solenoid 60 positioned within an annular recess 62 formed in housing 46 and held in place by means of a sleeve member 64 positioned between solenoid 60 and diaphragm 52. An armature 66 is positioned within a central opening 68 in solenoid 60 for axial movement in alignment with disc 58. One end of armature 66 has an annular flange 70 formed thereon. Upon energization of solenoid 60, armature 66 is movable from a released position, in which its flanged end engages a stop member 72 mounted on housing 46, to an attracted position, in which annular flange 70 engages solenoid 60.

Circuit means are provided for controlling the energization of solenoid 60. To this end, a suitable source of electric energy is provided as, for example, a transformer 74 having its primary coil connected at one end to a line wire 76 and at the other end to a line wire 78. One terminal of the secondary coil of transformer 74 is connected by a wire 80 to one end of solenoid 60, while the other terminal of secondary coil of transformer 74 is connected by a wire 82 to the other end of solenoid 60. A thermostatically controlled switch means 84 may be serially connected in wire 82 to control the opening and closing of the solenoid supply circuit.

An upper housing 86 is secured to casing 10 by means of a plurality of bolts 88. Housing 86 has a substantially cylindrical internal cavity 90 disposed in axial alignment with a bore 92 formed in casing 10 and communicating with inlet chamber 18. A flexible diaphragm 94 secured between cooperating faces 96 and 98 of casing 10 and housing 86, respectively, seals inlet chamber 18.

Any suitable safety means, such as thermoelectric safety means, is provided for actuating valve member 26 to a closed position upon failure of the pilot flame. Such means comprises a solenoid 100 biased upwardly into a recess 102 formed in housing 86 by means of a spring 104 positioned in compression between the underside of solenoid 100 and diaphragm 94. The current for solenoid 100 is supplied by a thermocouple means (not shown) positioned in proximity with the pilot burner flame. An armature 106 extends within a central opening 108 in solenoid 100 and is guided thereby for axial movement.

One end of armature 106 is formed with an expanded portion 110 having an annular shoulder 112 engageable with the underside of solenoid 100 when armature 106 is in its attracted position. Secured to armature 106 for axial movement therewith is an actuator stem 114 which is adapter to clamp diaphragm 94 between expanded portion 110 and a flange 116 formed on actuator stem 114. Actuator stem 114 also serves as a spring seat for a spring 118 mounted in compression between flange 116 and the upstream side of valve member 26.

Armature 106 is biased toward a released position in which actuator stem 114 engages solid portion 32 of valve stem 30 to move valve member 26 to a closed position. To this end, a spring 120 is mounted in compression between a circular disc 122, which rests on the upper end of armature 106, and the base 124 of a cup-shaped member 126, which is positioned for slidable movement within a cylindrical recess 128 in housing 86. Spring 120 normally maintains cup-shaped member 126 in an upward position in which base 124 engages an upper wall 130 of housing 86. A small button 132 extends through wall 130 and is secured to base 124 of cup-shaped member 126 for conjoint movement therewith. Button 132 and member 126 serve as a means for resetting solenoid 100 to an attracted position as will be described hereinafter.

In the operation of the FIG. 1 embodiment, the control valve is in its normal standby position, as shown in FIG. 1, when the pilot flame is burning and the supply circuit to solenoid 60 is open. A flame at the pilot burner heats the thermocouple (not shown) to cause energization of solenoid 100 which, in turn, retains armature 106 in its attracted position.

Valve member 26 may be moved to its open position by the closure of the thermostatically controlled switch means 84 which causes energization of solenoid 60. Armature 66 is then actuated upwardly toward its attracted position. By this movement, the upper end of armature 66 engages disc 58 and moves the same toward valve member 26. Disc 58 thus engages plunger 38 at shaft portion 40 causing upward movement of valve stem 30 by the action of spring 42 on solid portion 32. The movement of plunger 38 by armature 66 acting through disc 58 is transferred to spring 42 as a compressive force tending to push valve member 26 away from valve seat 24. The opposing forces tending to close valve member 26 are spring 118 and a pressure differential across valve seat 14. As valve member 26 moves away from valve seat 24, the pressure differential decreases but the force exerted by spring 118 increases so that a relative balance of opposing forces is maintained. The compression rate of springs 42 and 118 are chosen so that spring 42 will be only slightly additionally compressed, if at all, in pushing valve member 26 to its open position. The upward movement of armature 66 is stopped upon engagement of flange 70 with the underside of solenoid 60 at which time armature 66 is in its attracted position. Armature 66 will be held in this position by the magnetic force produced by solenoid 60. With armature 66 in its attracted position and the spring 42 in its slightly compressed position, the operating solenoid means, comprising solenoid 60, armature 66, plunger 38 and spring 42, is in what may be termed an "active" position in which valve member 26 is maintained in its open position.

If the pilot flame should be extinguished, the thermoelectric safety means will be operative to shut off the flow of fuel through the control valve. Pilot flame failure permits cooling of the thermocouple whereby there will not be sufficient current supplied to solenoid 100 to maintain armature 106 in its attracted position against the bias of spring 120. Hence, armature 106 is forced downwardly to its released position by the action of spring 120.

At the beginning of this movement of armature 106 to its released position, actuator stem 114 will engage the solid portion 32 of valve stem 30 which is maintained in an upward position by spring 42. Since the released force of spring 120 urging actuator stem 114 downwardly is much greater than the force of spring 42 urging valve stem 30 upwardly, the valve stem 30 is moved downwardly until valve member 26 is in engagement with valve seat 24. During this closing movement of valve stem 30, spring 42 is moved to a contracted position. Although this increases the downward bias on armature 66, solenoid 60 is designed to produce a magnetic force strong enough to hold armature 66 in its attracted position during movement of spring 42 from its slightly compressed condition to its contracted condition. With armature 66 in its attracted position and spring 42 in its contracted condition, the solenoid means is in the "inactive" position.

In order to reset the thermoelectric safety means upon relighting of the pilot burner, solenoid 100 is moved into engagement with the expanded portion 110 of armature 106 by depression of button 132 which moves cup-shaped member 126 and solenoid 100 downwardly. When the thermocouple supplies sufficient current to lock armature 106 in its attracted position against the bias of spring 120, button 132 is released allowing spring 104 to return these parts to their normal standby position as shown in FIG. 1.

It is to be noted that since the thermoelectric safety solenoid in some applications may have to be uneconomically large to compress heavy spring 120 by the armature thrust, it may be necessary to construct it primarily as an electromagnet unit.

Figure 2:
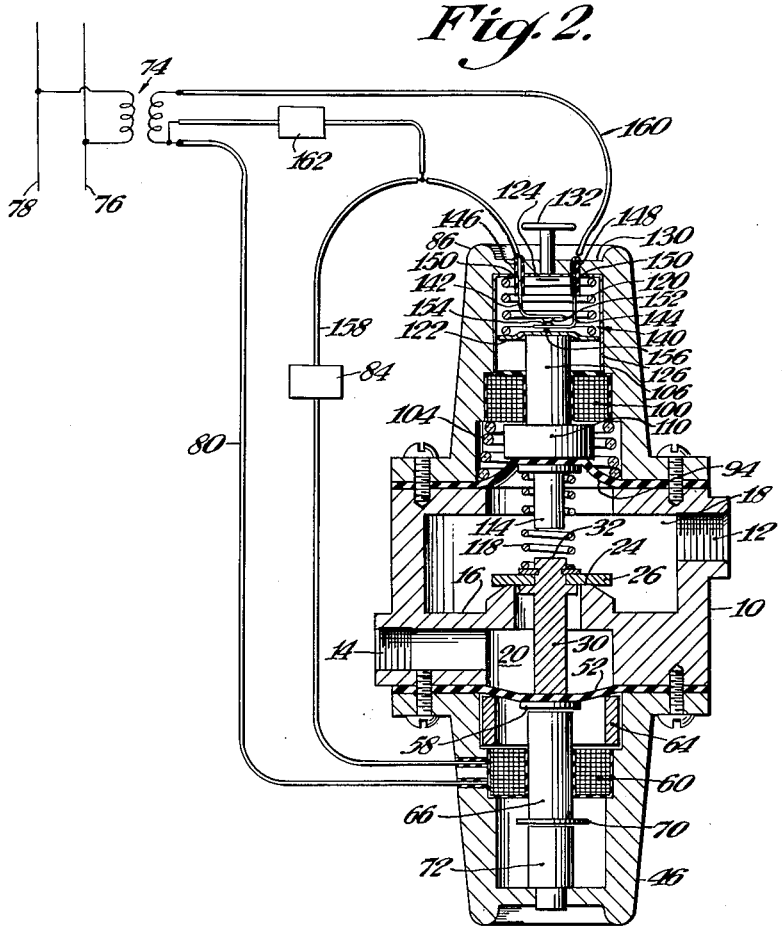
FIG. 2 is a sectional view of another embodiment of the invention.

The embodiment of the invention shown in FIG. 2, wherein parts corresponding to the parts hereinbefore described are given like reference numerals, is similar to the embodiment shown in FIG. 1, but differs therefrom in the form of valve stem used and in the means for actuating the operating solenoid means to its "inactive" position. Accordingly, the description will be limited to these differences. This embodiment of the invention would be more desirable than the FIG. 1 embodiment in applications requiring very small valves where a valve stem with a hollow portion as in the FIG. 1 embodiment is necessarily too large to be practical or in applications wherein an alarm device for remotely indicating valve closure is desirable.

In this embodiment, valve stem 30 takes the form of a solid rod having valve member 26 secured to one end thereof and engageable with the inner side of flexible diaphragm 52 at the other end thereof. Valve stem 30 engages diaphragm 52 adjacent disc 58 secured to the outer side of diaphragm 52.

The operating solenoid means for actuating valve member 26 between its open and closed positions comprises solenoid 60, armature 66 and disc 58. When solenoid 60 is energized, armature 66 will be moved to its attracted position with flange 70 in engagement with the underside of solenoid 60 and armature 66 maintaining valve stem 30 and valve member 26 in an upward position. This is the "active" position of the operating solenoid means. When solenoid 60 is not energized, armature 66 will rest on stop member 72 by reason of its own weight whereby valve member 26 may be moved into engagement with valve seat 24 by spring 118. This is the "inactive" position of the operating solenoid means.

Means are provided for actuating the solenoid means to its "inactive" position upon movement of the thermoelectric safety means toward its valve closing position. To this end, a switch means 140 is serially connected in the circuit connecting solenoid 60 to its source of electric energy. Switch means 140 comprises a pair of L-shaped conductors 142 and 144 secured at their vertical legs to wall 130 of housing 86 and arranged so that their horizontal legs are in spaced opposed relation. The vertical legs of conductors 142 and 144 have insulator conduits 146 and 148 thereon, respectively, to insulate the same from housing 86. The vertical legs of conductors 142 and 144 extend through cut-outs 150 in the base 124 of cup-shaped member 126 whereby there is no interference with the movement thereof upon depression of button 132.

A pair of contacts 152 and 154 are mounted in opposed relation on the horizontal legs of conductors 142 and 144, respectively. Since the horizontal leg of conductor 144 is flexible, contact 154 is movable into and out of engagement with contact 152 which is mounted in a relatively fixed position by conductor 142. Contact 154 is normally biased to an open position by conductor 144 but is maintained in a closed position by armature 106 when it is in its attracted position whereby circular plate 122 engages an insulator button 156 on the underside of the horizontal leg of conductor 144 to flex the same against its bias to a position in which contacts 152 and 154 are in engagement. Conductor 142 is connected to one end of solenoid 60 by wire 158 and conductor 144 is connected to the secondary coil of transformer 74 by a wire 160.

In this embodiment, thermostat 84 is connected in wire 158 and an alarm device 162 is connected in a wire 164 which is connected between a terminal of transformer 74 and wire 158. By this arrangement, the alarm device 162 is operative to indicate the condition of switch means 140 without regard to the condition of thermostat 84.

In the operation of the FIG. 2 embodiment, the control valve is in its normal standby position, as shown in FIG. 2, when solenoid 100 is energized in response to a flame at the pilot burner to maintain armature 106 in its attracted position and solenoid 60 is de-energized in response to the action of the thermostatically controlled switch means 84 preventing the supply of power thereto. In this position, valve member 26 is biased to its closed position by spring 118.

The operating solenoid means will be operative to actuate valve member 26 to its open position upon closure of the thermostatically controlled switch 84 which permits the flow of current to solenoid 60 from transformer 74. The current flows from one terminal of the secondary coil transformer 74 through wire 160, conductor 144, contacts 154 and 152, conductor 142, wire 158, solenoid 60, and wire 80 back to the other terminal of the secondary coil of transformer 74. Armature 66 is thus actuated upwardly to its attracted position. By this movement, the upper end of armature 66 engages disc 58 and moves the same toward valve member 26. Through flexible diaphragm 52, disc 58 moves valve stem 30 and valve member 26 to the open position. With armature 66 held in its attracted position by the magnetic force produced by solenoid 60 and the valve stem 30 in its upward position, the operating solenoid means is in its "active" position in which valve member 26 is maintained in its open position.

Upon failure of the pilot flame, armature 106 will be moved downwardly to its released position by the spring 120 as was previously described. As armature 106 moves downwardly, circular disc 122 permits downward movement of contact 154 under the bias of conductor 144. The parts are constructed and arranged so that as armature 106 moves downwardly, contacts 152 and 154 move out of engagement before actuator stem 114 engages the upper portion 32 of valve stem 30. Since the opening of contacts 152 and 154 causes de-energization of solenoid 60, armature 66 will fall to its released position against stop member 72. Thus, there is no opposing force acting against the closing force of actuator stem 114 and spring 118 on valve stem 30 and on valve member 26, respectively, whereby valve member 26 will be moved into engagement with valve seat 24.

In order to reset the control valve to the normal standby position, button 132 is depressed to magnetically lock armature 106 to solenoid 100 as was previously described. The button 132 is designed to avoid any contact with conductors 142 and 144 during the resetting operation.

Figure 3:
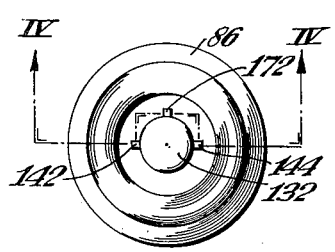
FIG. 3 is a plan view of a modified form of a detail of the embodiment shown in FIG. 2.
Figure 4:
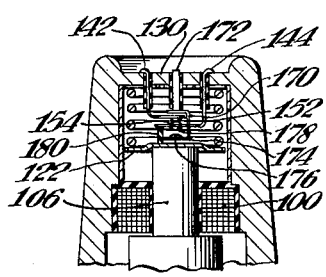
FIG. 4 is a fragmentary section taken on lines IV—IV of FIG. 3.

A modified form of switch means is illustrated in FIGS. 3 and 4. This form of switch means comprises a third conductor 170 mounted on a post 172 which is insulatedly mounted in wall 130. Conductor 170 has a horizontal leg 174 which extends beneath the horizontal leg of conductor 144 and has a contact 176 thereon oppositely disposed with respect to a contact 178 secured to the underside of the horizontal leg of conductor 144. Contact 176 is maintained in a relatively fixed position by conductor 170.

Contacts 154 and 178 are normally biased downwardly by conductor 144 to a position in which contact 178 engages contact 176 and contact 154 is spaced from contact 152. However, when armature 106 is in its attracted position, a stud member 180, which is mounted on circular disc 122, engages the horizontal leg of conductor 144 to move the same to an upper position in which contact 154 engages contact 152 and contact 178 is spaced from contact 176. Upon movement of armature 106 to its released position, contact 154 will move out of engagement with contact 152 by reason of the bias of conductor 144. Hence, switch means 140 serves to break the supply circuit to operating solenoid 60 and close the circuit between movable contact 178 and contact 176 which could be electrically connected to a circuit which operates a warning signal or to serve other purposes.

It is to be understood that although several embodiments and modifications of this invention have been shown and described for purposes of illustration, the invention can be variously embodied and changes may be made in the construction and arrangement of parts without departing from the scope of the invention as defined by the appended claims.

I claim:
1. In a flow control device, the combination comprising valve head means movable between an open position and a closed position, first solenoid means including a first armature engageable with one side of said valve head means to move said valve head means to said open position when said first solenoid means is energized, second solenoid means including a second armature engageable with the other side of said valve head means to define said open position when said second solenoid means is energized, first resilient means biasing said second armature in a direction urging said valve head means toward said closed position, second resilient means in said valve head means engageable with said first armature when said first solenoid means is energized to resiliently bias said valve head means toward said open position, said first biasing means being operable upon deenergization of said second solenoid means to overcome the biasing force of said second resilient means to cause said second armature to shift said valve head to said closed position irrespective of the energization of said first solenoid means.

2. The combination of claim 1 wherein said valve head means comprises a valve head having a hollow stem thereon projecting toward said first armature, a plunger slidable within said stem and projecting from said stem toward said first armature, a seat in said stem for limiting movement of said plunger toward said first armature, said plunger being resiliently biased toward said seat by said second resilient means.

3. The combination of claim 1 further comprising third resilient means engaged between said second armature and said valve head means for resiliently biasing said valve head means to said closed position when said first solenoid means is deenergized.

4. In a flow control device, the combination comprising a valve member being adapted for movement between a pair of control positions, a pair of armatures being disposed substantially in alignment with each other and each being positioned on opposite sides of said valve member, solenoid means operatively associated with each of said armatures, a resilient valve stem means being mounted to said valve member and being adapted for engagement with one of said armatures, one of said solenoid means being operatively associated with said one of said armatures and being adapted upon energization to actuate said one of said armatures for moving said valve member to one of said control positions, the other of said solenoid means being adapted upon energization for retaining a second of said armatures in a retracted position, thermoelectric means for energizing said other of said solenoid means, and biasing means operatively connected to said second of said armatures and being adapted for biasing said second of said armatures to move said valve member to a second control position when said other of said solenoid means is deenergized whereby said resilient valve stem means is compressed and said one of said armatures is actuated to a retracted position when said one of said solenoid means is energized.

5. A control device as defined in claim 4 wherein said resilient valve stem means comprises a hollow stem projecting from said valve member toward said one of said armatures, a plunger mounted for limited sliding movement longitudinally within said hollow stem and having a shaft projecting from said stem toward said one of said armatures, and a compression spring in said hollow stem resiliently biasing said plunger toward said one of said armatures.

6. A control device as defined in claim 5 wherein the biasing force exerted by said biasing means upon said second armature exceeds the biasing force of said compression spring, the range of movement of said plunger within said hollow stem being sufficient to permit said valve member to be moved from said one of said control positions to said second control position upon compression of said compression spring by the biasing force exerted thereon by said biasing means.

7. In a flow control device, the combination comprising a valve member movable between a pair of control positions, a pair of armatures being disposed substantially in alignment with each other on opposite sides of said valve member and each being operatively connected to said valve member, solenoid means operatively associated with each of said armatures, one of said solenoid means being adapted upon energization to actuate one of said armatures for moving said valve member to one of said control positions, other of said solenoid means being adapted upon energization for retaining said second armature in a retracted position, thermoelectric means for energizing said other of said solenoid means, biasing means operatively connected to said second armature and being adapted for biasing said second armature to move said valve member to a second control position upon deenergization of said thermoelectric means, and switch means operatively connected to said second armature and serially connected in an electrical supply circuit for said one of said solenoid means, said switch means being actuated to a short circuit position upon movement of said second armature in response to deenergization of said thermoelectric means whereby energization of said one of said solenoid means may be initiated only when said second armature is retained in said retracted position by said other of said solenoid means.

8. A control device as claimed in claim 7 wherein said switch means comprises a pair of oppositely disposed fixed contacts and a movable contact positioned between said fixed contacts and being adapted for movement into engagement therewith, said movable contact being biased into engagement with one of said fixed contacts, and an actuator member operatively engaging said movable contact and being adapted for movement with said second armature whereby said movable contact is released from engagement with the other of said fixed contacts and caused to move into engagement with said one of said fixed contacts when said other of said solenoid means is deenergized.

References Cited in the file of this patent
UNITED STATES PATENTS

| | | |
|---|---|---|
| 2,207,771 | Arden | July 16, 1940 |
| 2,268,960 | Ray | Jan. 6, 1942 |
| 2,873,069 | Matthews | Feb. 10, 1959 |